United States Patent
Vallejo Pineda et al.

(10) Patent No.: US 10,098,799 B2
(45) Date of Patent: Oct. 16, 2018

(54) ELECTRIC WHEELCHAIR

(71) Applicant: Robert Andrey Vallejo Pineda, Alicante (ES)

(72) Inventors: Robert Andrey Vallejo Pineda, Alicante (ES); José María Marin Lopez, Alicante (ES); José Robeiro Vallejo Ocampo, Alicante (ES); Francisco García Cutillas, Alicante (ES)

(73) Assignee: Robert Andrey Vallejo Pineda, Santa Pola, Alicante (ES)

( * ) Notice: Subject to any disclaimer, the term of this patent is extended or adjusted under 35 U.S.C. 154(b) by 0 days.

(21) Appl. No.: 15/554,084

(22) PCT Filed: Feb. 26, 2016

(86) PCT No.: PCT/ES2016/070129
§ 371 (c)(1),
(2) Date: Aug. 28, 2017

(87) PCT Pub. No.: WO2016/135366
PCT Pub. Date: Sep. 1, 2016

(65) Prior Publication Data
US 2018/0036191 A1    Feb. 8, 2018

(30) Foreign Application Priority Data
Feb. 27, 2015   (ES) .................................. 201530254

(51) Int. Cl.
*A61G 7/10*      (2006.01)
*A61G 5/10*      (2006.01)

(52) U.S. Cl.
CPC ......... *A61G 7/1048* (2013.01); *A61G 7/1017* (2013.01); *A61G 7/1051* (2013.01); *A61G 7/1076* (2013.01); *A61G 5/101* (2013.01); *A61G 5/104* (2013.01); *A61G 5/1089* (2016.11); *A61G 2203/14* (2013.01); *B60Y 2200/84* (2013.01); *B60Y 2200/91* (2013.01)

(58) Field of Classification Search
CPC ................ A61G 7/1051; A61G 7/1046; A61G 2200/34; A61G 7/1019; A61G 7/1017; A61G 7/1015; A61G 7/1076; A61G 7/1048; A61G 2203/14
See application file for complete search history.

(56) References Cited

U.S. PATENT DOCUMENTS

| | | | |
|---|---|---|---|
| 3,137,869 A | 6/1964 | Johnson | |
| 2004/0251063 A1* | 12/2004 | Patterson | A61G 3/0209 180/65.1 |
| 2004/0251656 A1* | 12/2004 | Patterson | A61G 3/0209 280/304.1 |

(Continued)

FOREIGN PATENT DOCUMENTS

ES    2369454    12/2011

*Primary Examiner* — Bryan A Evans
(74) *Attorney, Agent, or Firm* — Hayes Soloway PC (57) ABSTRACT

The present invention relates to an electric wheelchair incorporating a lifting mechanism which makes it possible to transfer a disabled or dependent person from the wheelchair itself to any desired surface, such as a bed, a toilet, a hospital bed, etc. and vice versa from said surface to the wheelchair, and armrests comprising an anchoring device for fixing a patient support sling.

19 Claims, 9 Drawing Sheets

(56) References Cited

U.S. PATENT DOCUMENTS

| | | | | |
|---|---|---|---|---|
| 2005/0217024 | A1* | 10/2005 | Aarestad | A61G 7/1015 5/86.1 |
| 2012/0090089 | A1* | 4/2012 | Stryker | A61G 7/10 5/87.1 |
| 2013/0168945 | A1* | 7/2013 | Pivato | A61G 7/1046 280/304.1 |
| 2014/0109312 | A1* | 4/2014 | Gray | A61G 5/14 5/86.1 |
| 2015/0051519 | A1* | 2/2015 | Morbi | A61H 3/00 601/26 |
| 2015/0056050 | A1* | 2/2015 | Decuir, Jr. | A61G 7/1015 414/550 |
| 2017/0258653 | A1* | 9/2017 | Wike, Jr. | A61G 5/14 |

* cited by examiner

ELECTRIC WHEELCHAIR

OBJECT OF THE INVENTION

The present invention relates to an electric wheelchair that incorporates a lifting mechanism which makes it possible to transfer a disabled or dependent person from the wheelchair to any desired surface, such as a bed, a toilet, a hospital bed, etc. and vice versa, from said surface to the wheelchair.

The object of the present invention is an electric wheelchair which enables a disabled person to move without need for classic lifts and, in turn, allows the caregiver to move without making any type of effort, facilitating the personal hygiene of the dependent person and providing greater safety during displacement, thereby improving the quality of life of the caregiver and of the dependent person.

BACKGROUND OF THE INVENTION

Transferring disabled persons or dependent elderly persons is a complicated task even for several people, due to the effort required to move them, which can lead to serious health problems for caregivers, ranging from muscular pains to lumbago or hernias which lead to sick leave as a result of this activity.

There are currently displacement lifts which are robust and can only be used within the person's dwelling. They also have the drawback of requiring a great deal of space to transfer the person, due to which their use may be restricted to hospital centres, nursing homes, etc.

In addition to wheelchairs, a chair is known to exist that serves to manually transfer the disabled person from the wheelchair to the bed, which has two lift cylinders for situating the person at the desired height, a backrest detachable from the chair structure, which is removed to execute the movement, and a sliding seat for situating the person as close as possible to the centre of the bed.

Furthermore, patent of invention ES2369454B1 relates to a chair lift for handling disabled persons, which consists of a chair structure with a seat having an opening closed by a practicable lid for enabling the disabled user to satisfy his or her physiological needs in a sitting position, wherein the seat and the backrest are detachable with respect to the chair structure in order to situate the disabled person, and wherein the chair comprises a hydraulic cylinder for lifting the chair structure and, therefore, the disabled person in that chair, for the subsequent transfer thereof.

The two aforementioned chairs, while fulfilling their function, have several limitations, including the fact that the caregiver must execute a movement whereby he or she turns and pushes the dependent person, which can affect their health, and the fact that their use is limited to interiors, since they do not have a structure optimized for its use outdoors or on irregular ground.

Therefore, the known solutions of prior arts do not offer fully satisfactory solutions to the current problem. The electric wheelchair of the present invention contributes to solve the current problem, as it offers a new way of transferring disabled persons, thereby achieving enhancements with respect to the current state of the art and contributing quality of life to caregivers and users.

DESCRIPTION OF THE INVENTION

The present invention relates to an electric wheelchair comprising a rigid chassis, a set of wheels formed by front wheels and rear wheels, a seat, armrests and a backrest, wherein the rigid chassis comprises in turn a seat elevating mechanism and a lifting mechanism.

The seat elevating mechanism makes it possible to situate the person at the desired height, i.e. at the same height as the surface where we wish to position the person wherein, preferably, the seat elevating mechanism comprises a lower plate fixed to the chassis, an upper plate joined to the seat and a scissor mechanism actuated by means of an electric actuator.

The armrests are foldable around a transverse axis, such that a free end thereof is lifted from its resting or horizontal position to a raised position, and comprise an anchoring device disposed on said free end of both armrests, which makes it possible to couple a patient support sling once said sling has been positioned underneath the user's legs and, optionally, on the back and back of the head, for subsequently lifting and transferring the person with respect to the wheelchair chassis.

The lifting mechanism comprises an actuator connected by one end to the backrest and, by the other end, to the armrests that make it possible to raise the person once he or she is held by means of the sling fixed to the anchoring device disposed on the armrests.

The armrests and backrest rotate at least 90° around a vertical axis with respect to the rigid chassis, preferably due to the fact that the chair comprises a rotation mechanism, which allows the person strapped into the sling to be situated on the surface whereon we wish to situate them. To this end, the chair is disposed with its back part disposed opposite the surface where the patient will be positioned.

Optionally, at least one of the armrests is foldable around the transverse axis from the raised position to an essentially vertical position, in order to withdraw the chair by means of a linear displacement once the sling has been uncoupled from the anchoring device without interfering with the person.

The chair also comprises a first controller that makes it possible to control the movement of all the actuators and wheelchair wheels.

The electric wheelchair of the present invention simultaneously offers the features of an electric wheelchair and of a transfer lift, with an optimum level of features in both aspects. On incorporating a lifting mechanism, the electric wheelchair allows the transfer of the disabled or dependent person from the wheelchair itself to any desired surface such as a bed, a toilet or a hospital bed and vice versa.

This enables the transfer of the disabled person without need to use classic lifts and, in turn, allows the caregiver to execute the movement without making any type of effort, facilitating the personal hygiene of the dependent person and providing greater safety during the transfer, resulting in the improved quality of life of the caregivers and of the disabled person.

The main advantage offered by the electric wheelchair of the present invention is that it allows the caregiver to transfer the user without running the risk to which he or she is commonly subjected, such as the back injuries or hernias that appear after a certain period of time.

Also, it provides advantages over transfer lifts since, on comprising a lifting mechanism included in the chair, it can be used anywhere, both outdoors and indoors, and offers good manoeuvrability in small spaces or whenever required. Lastly, on being a wheelchair that groups together the advantages of wheelchairs and lifts it improves the existing art, as well as lowering the price.

PREFERRED EMBODIMENT OF THE INVENTION

Following is a detailed description of the electric wheelchair of the present invention.

In a first embodiment shown in FIGS. 1 to 8, the electric wheelchair comprises a rigid chassis (1) whereon a set of wheels is disposed formed by rotating front wheels (2) for guiding the chair, rear drive wheels (3) actuated by a gear motor (21) which can be blocked to avoid the unwanted displacement of the chair and anti-tip wheels (4) disposed behind the rear drive wheels (3) that give the chair great stability when transferring the person to the surface whereto he or she is transferred.

The electric wheelchair also comprises a set of batteries (22, 27) that provide motion to actuators and to the gear motor (21) that execute the movements that will be described in detail later.

The electric wheelchair also comprises a seat (5) and a seat elevating mechanism (5) that comprises a lower plate (6) fixed to the rigid chassis (1), an upper plate (7) joined to the seat (5) and a scissor mechanism (8) actuated by means of an electric actuator (9) to position the seat (5) at the desired height.

The electric wheelchair also comprises folding armrests (10) that comprise a free end (11) which raises from its resting or horizontal position to a raised position that can be manually blocked by means of a quick-release pin and comprise an anchoring device (12) disposed on said free end (11) of both armrests (10) for coupling a lifting sling (13) placed underneath the user's legs, back and back of the head.

The electric wheelchair also has a lifting mechanism that comprises a linear actuator (14) connected by one end to a rotation rod (24) of a backrest (17) rotation mechanism that will be described later and, by the other end, to a strip (15) whereto the armrests (10) are articulated to lift the person once he or she is held by means of the sling (13) fixed to the anchoring device (12) disposed on the armrests (10).

The electric wheelchair also comprises a backrest (17) foldable around the transverse direction, defined as the horizontal direction that crosses the user from one side to the other to carry out a swinging movement that is solidary with the movement carried out by the person's back when he or she is lifted by the lifting mechanism, conferring additional comfort and safety to the person during the transfer.

Figure 1:
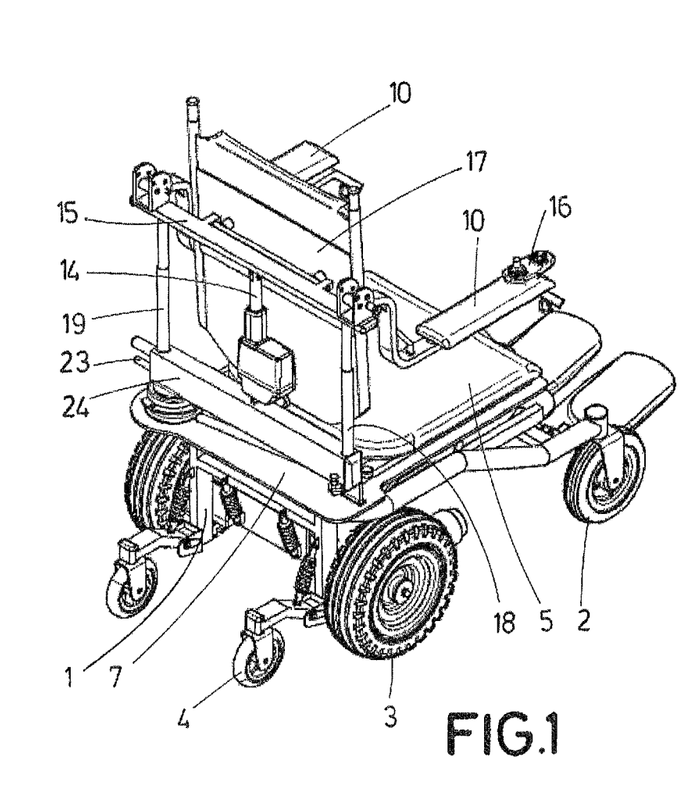
FIG. 1 shows a perspective view of a first preferred embodiment of the electric wheelchair of the present invention.
Figure 2:
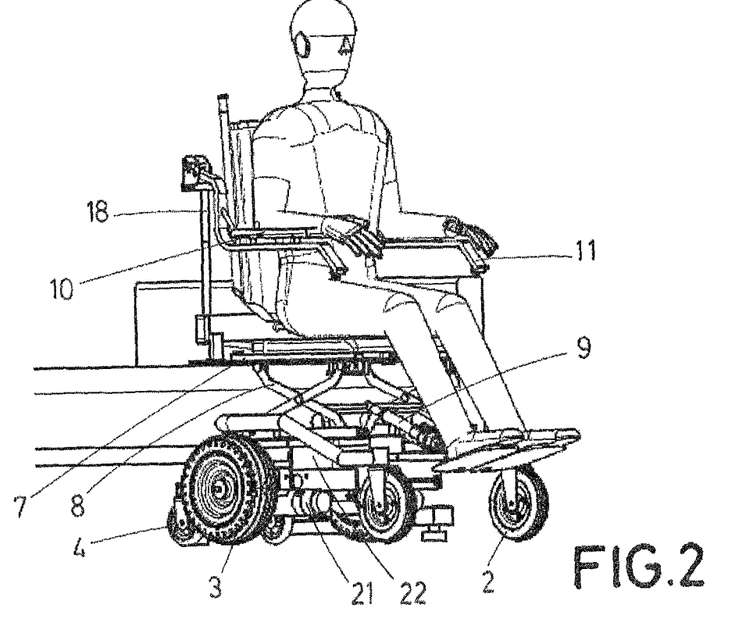
FIG. 2 shows a perspective view of the electric wheelchair of FIG. 1 with the patient sitting thereon, wherein the chair is disposed with its rear part disposed opposite the surface where the patient will be positioned.
Figure 3:
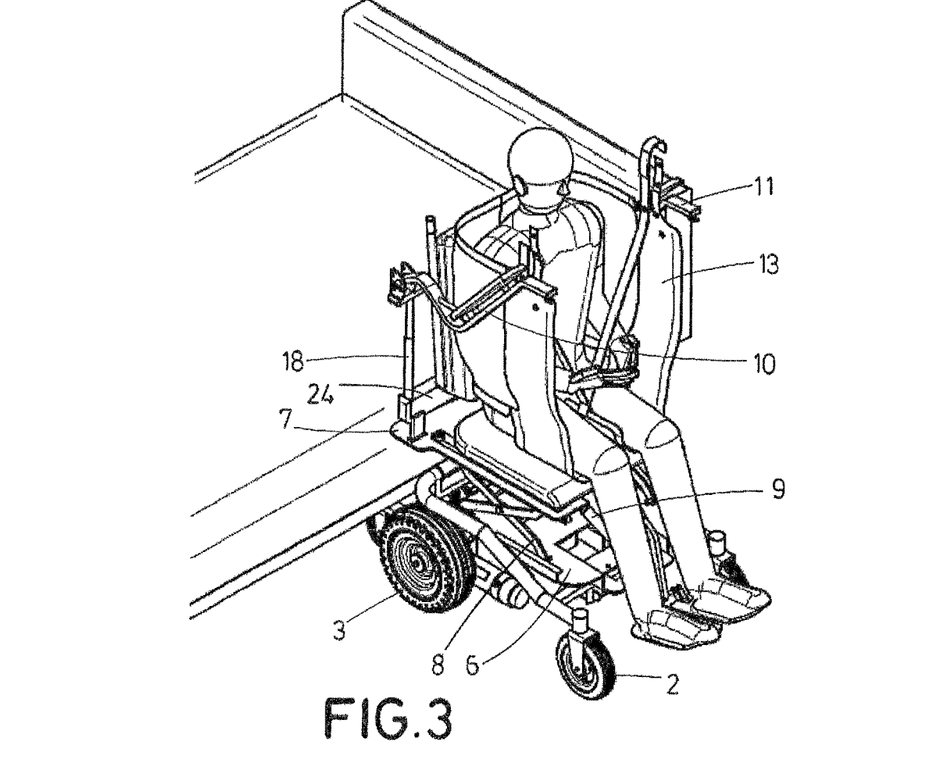
FIG. 3 shows a perspective view of the electric wheelchair of FIGS. 1 and 2 once the sling has been positioned to lift the patient.
Figure 4:
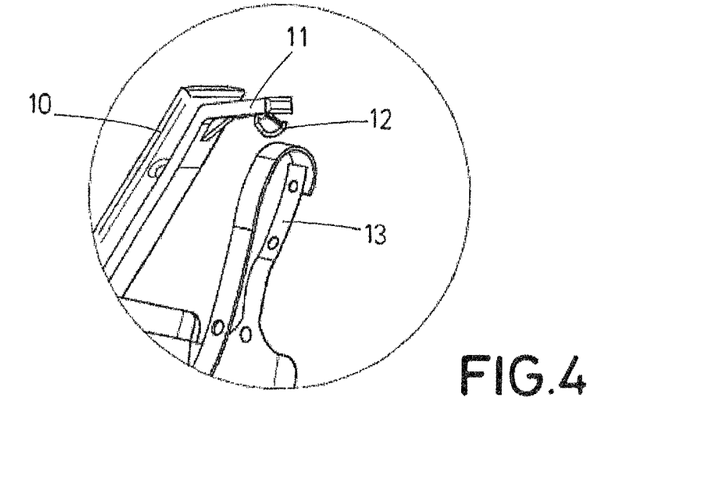
FIG. 4 shows a detailed view of the anchoring device of one of the armrests of the electric wheelchair of the present invention whereto the sling is anchored according to the first preferred embodiment.
Figure 5:
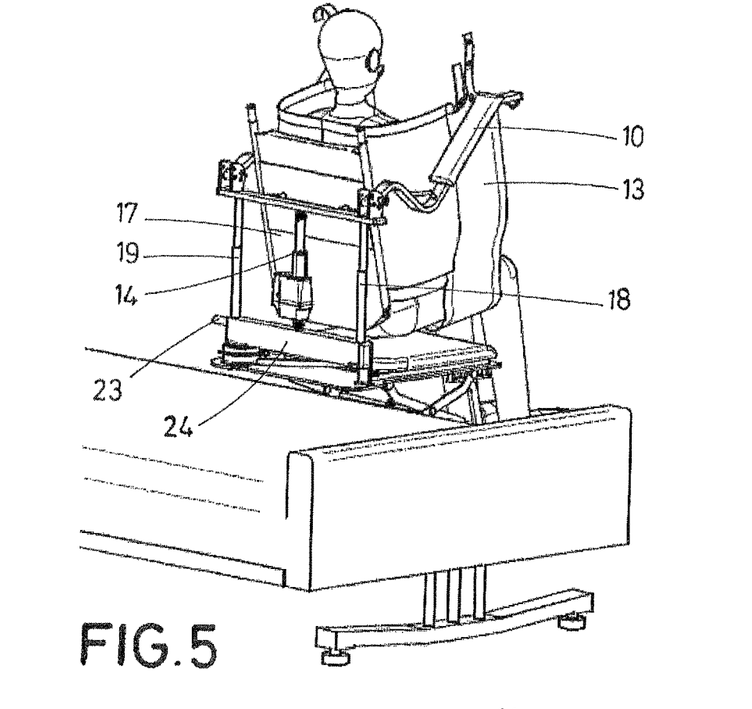
FIG. 5 shows a perspective rear view of FIG. 3.
Figure 6:
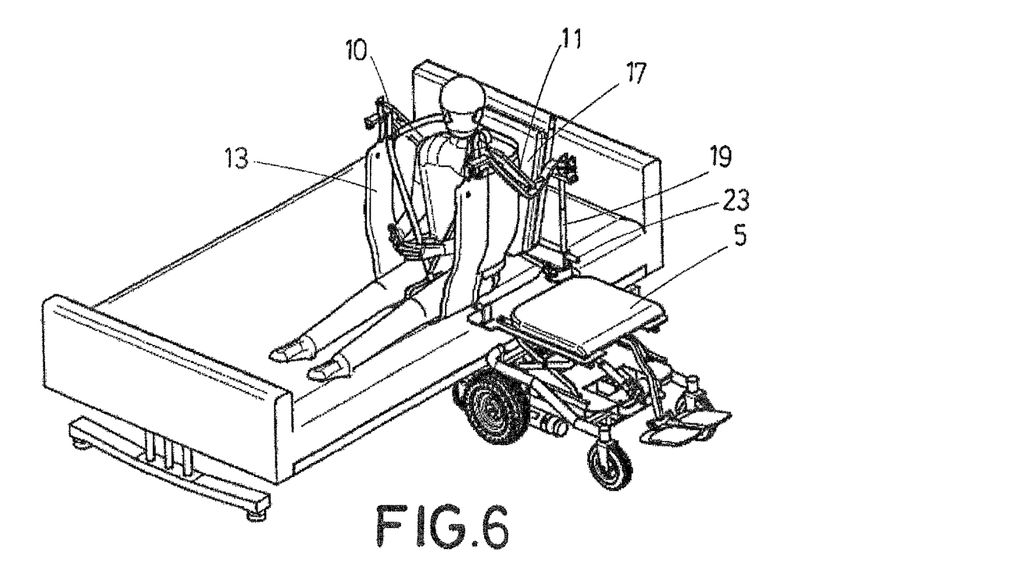
FIG. 6 shows a perspective view of the electric wheelchair of FIGS. 1 to 5 upon releasing the rotation mechanism which makes it possible to rotate the armrests and backrest at least 90° with respect to the chair chassis.
Figure 8:
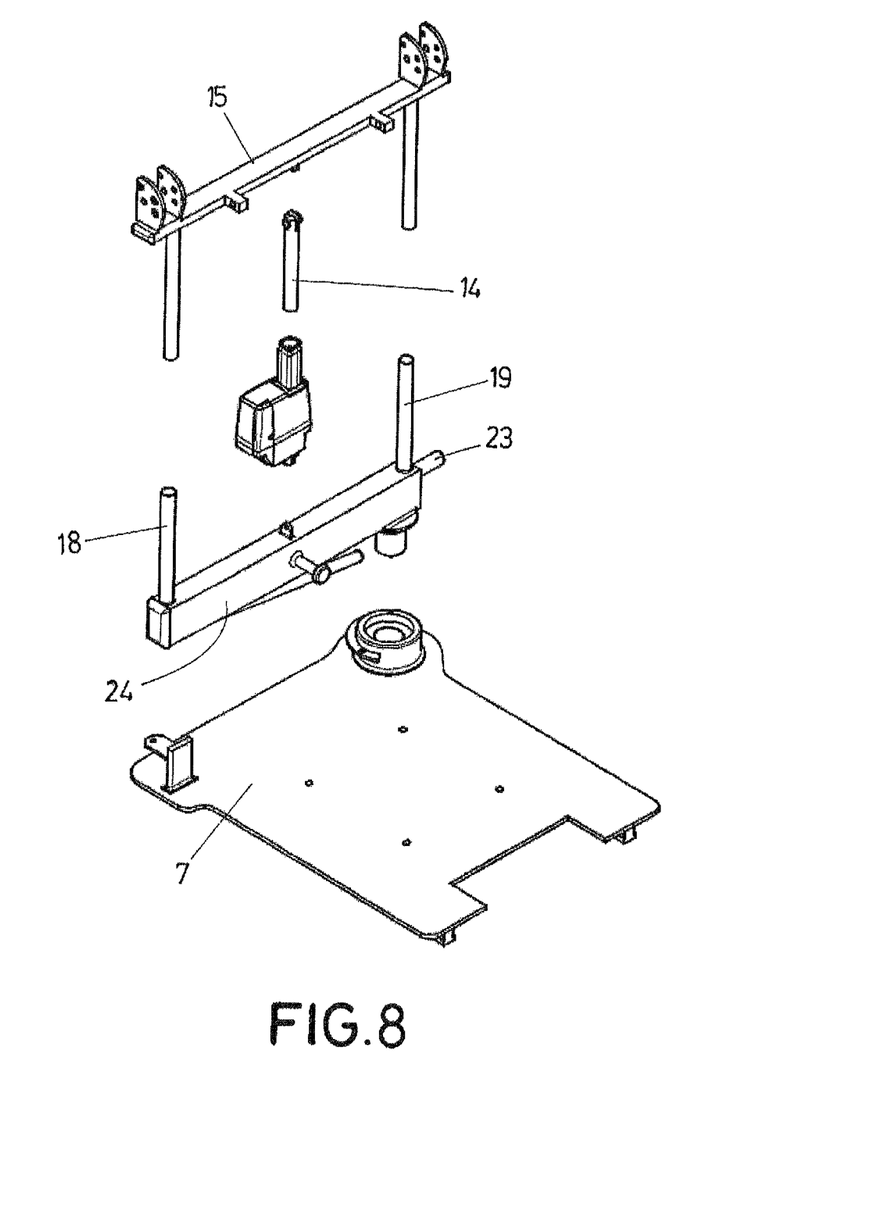
FIG. 8 shows an exploded view of the rotation mechanism of the armrests and the backrest according to the first preferred embodiment.
Figure 9:
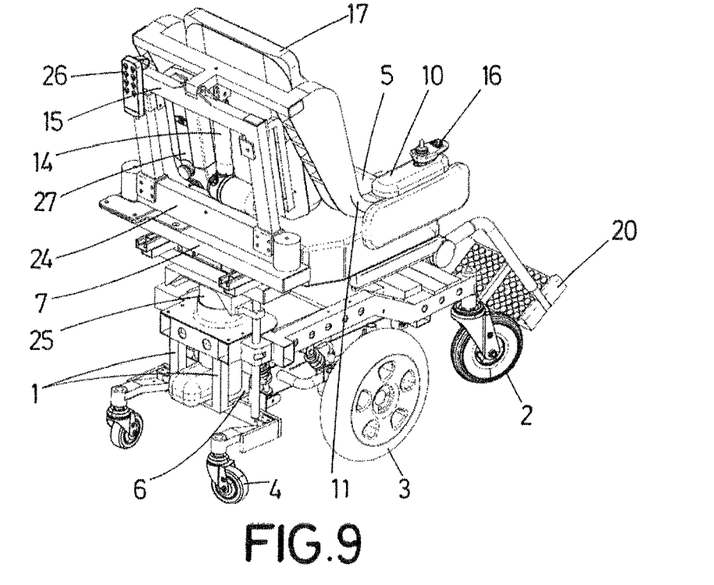
FIG. 9 shows a perspective view of a second preferred embodiment of the electric wheelchair of the present invention.
Figure 10:
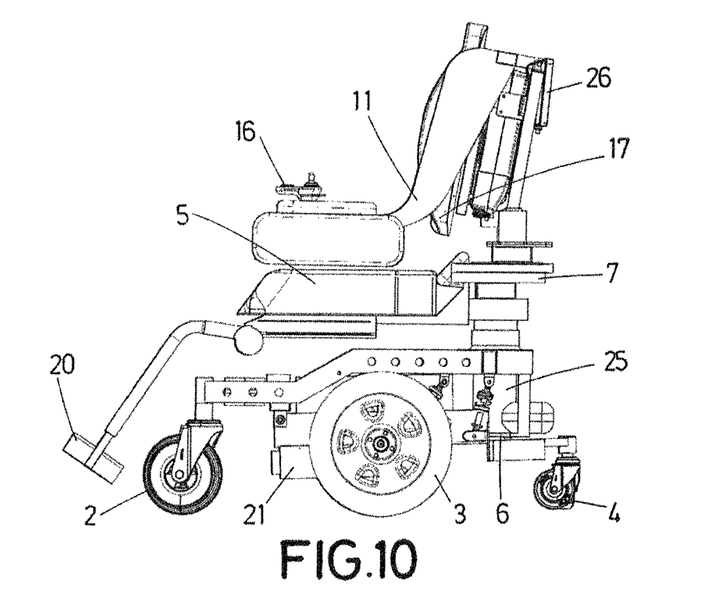
FIG. 10 shows a side view of FIG. 9.
Figure 11:
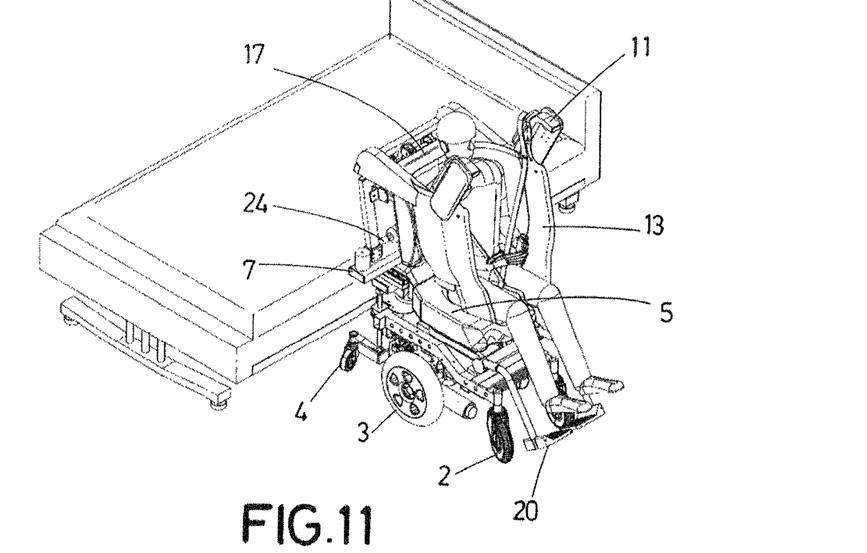
FIG. 11 shows a perspective view of the electric wheelchair of FIGS. 9 and 10 upon applying the sling to the patient to lift the person.
Figure 12:
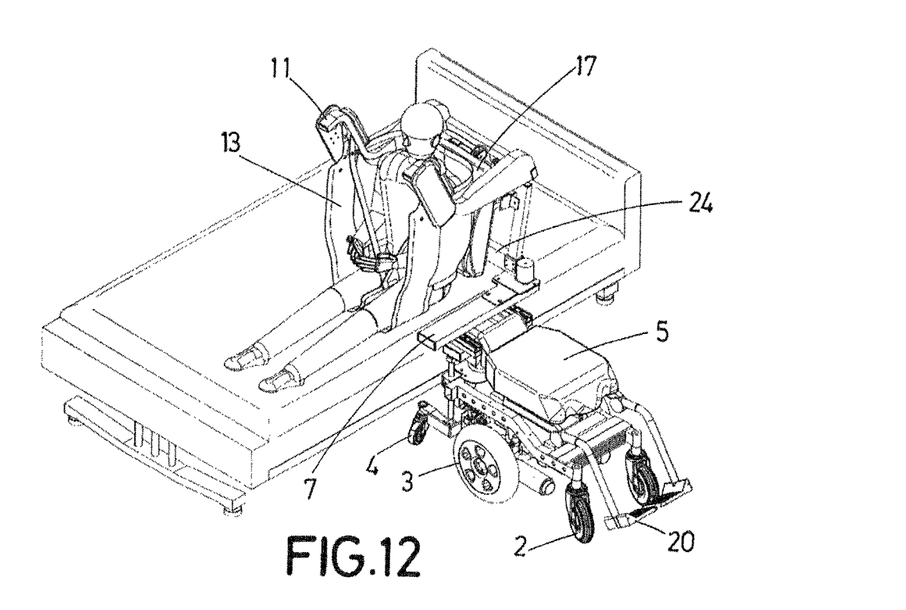
FIG. 12 shows a perspective view of the electric wheelchair of FIGS. 9 to 11 upon rotating the armrests and backrest at least 90° with respect to the chair chassis by means of the rotation mechanism.
Figure 13:
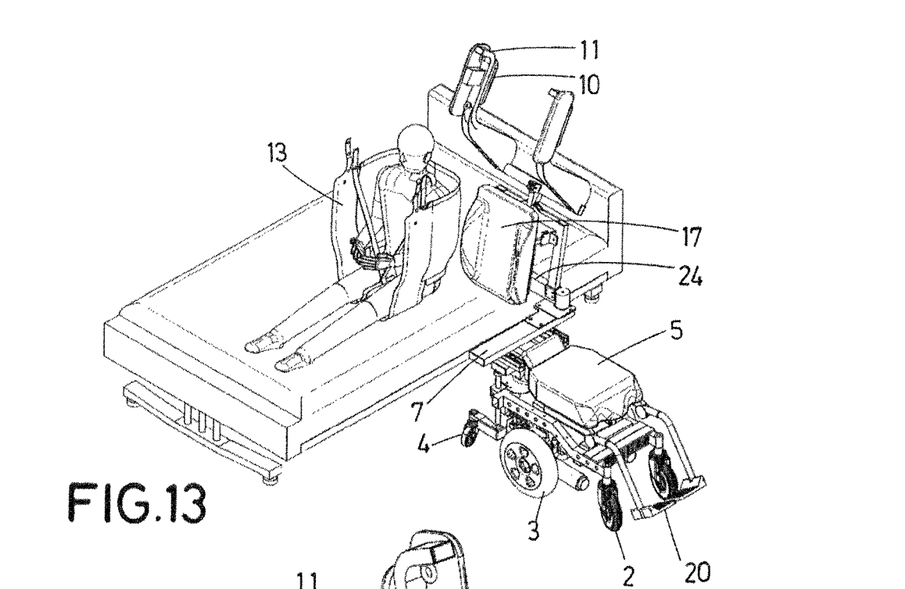
FIG. 13 shows a perspective view of the electric wheelchair of FIGS. 9 to 12 upon lifting the armrests from the raised position to an essentially vertical position, in order to withdraw the chair by means of a linear displacement upon uncoupling the sling from the anchoring device.
Figure 14:
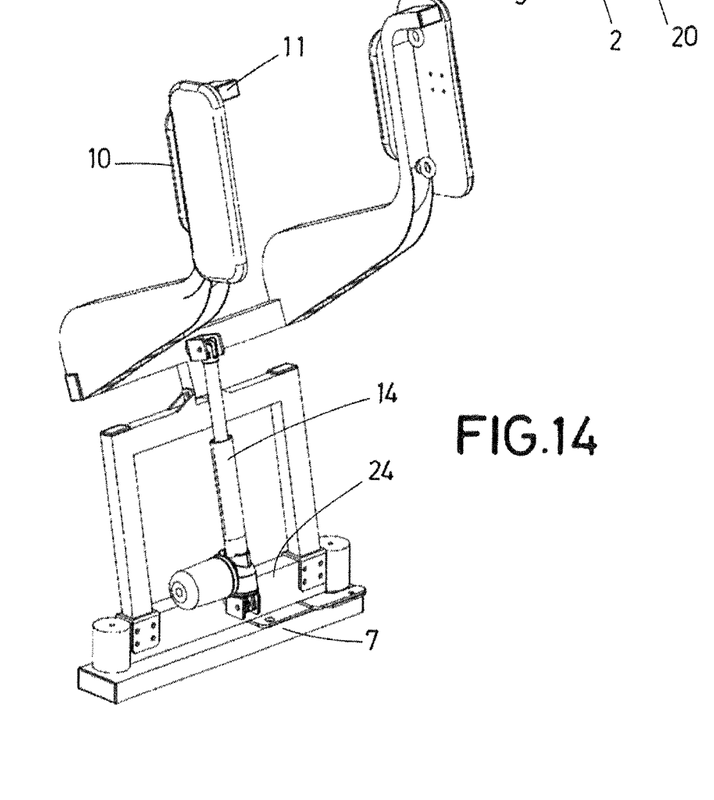
FIG. 14 shows a detailed view of the rotation mechanism of the armrests and the backrest with respect to the seat and to the lifting mechanism according to the second preferred embodiment.

The chair also comprises a rotation mechanism that makes it possible to rotate the armrests (10) and backrest (17) 90° around a vertical axis with respect to the chassis (1) of the chair and, consequently, to the person held by the sling (13), in order to position the person on the desired surface. The rotation mechanism comprises a closing and opening device (23), preferably elastic, that releases the rotation rod (24) whereto the linear actuator (14) of the lifting mechanism is connected, which is connected by the other end to the strip (15) whereto the armrests are articulated (10), in order to allow the rotation of the backrest (17) and the armrests (10) with respect to the upper plate (7) joined to the seat (5). The rotation mechanism also comprises a first joining rod (18) and a second joining rod (19) of the rotation rod (24) and the strip (15) whereto the armrests (10) are articulated.

Figure 7:
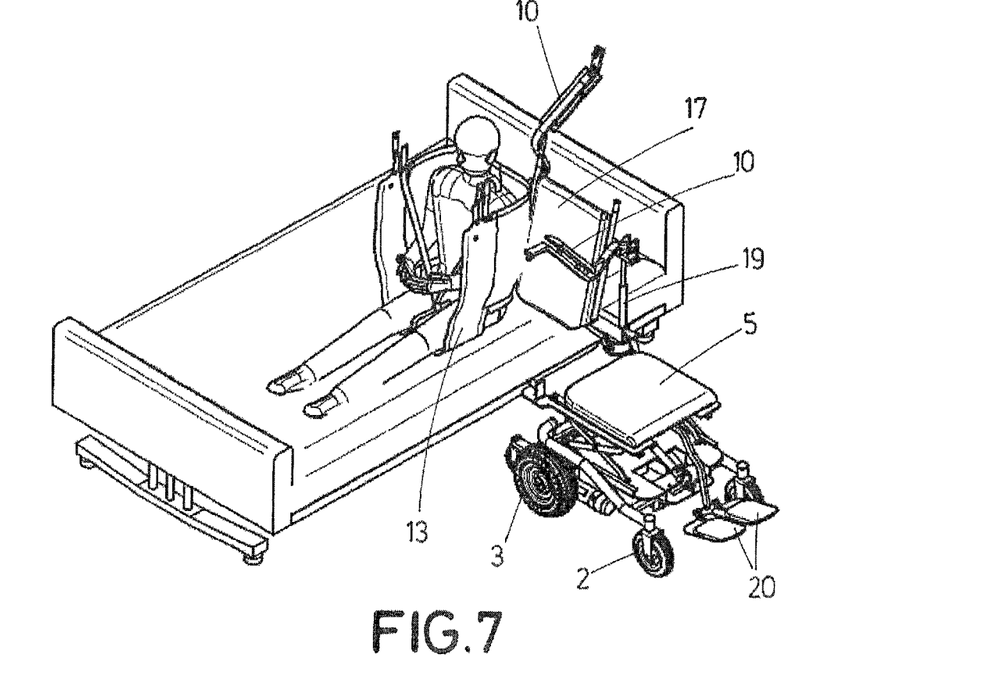
FIG. 7 shows a perspective view of the electric wheelchair of FIGS. 1 to 6 upon lifting at least one of the armrests from the raised position to an essentially vertical position in order to withdraw the chair by means of a linear displacement upon uncoupling the anchoring device.

The armrests (10) are foldable from the raised position to an essentially vertical position such as to withdraw the chair by means of a linear displacement upon uncoupling the sling (13) from the anchoring device (12), without interfering with the person.

The chair also comprises a first controller (16) or joystick that makes it possible to control the movement of the gear motor (21) of the wheels (3, 4) of the chair and the movement of the actuator (9) of the scissor mechanism (8), wherein the controller (16) is preferably couplable to one of the armrests (10) of the chair, said armrests (10) being equally uncouplable for being remotely controlled by the caregiver at a distance from the chair.

The chair comprises a second controller (26) or joystick that makes it possible to control the lifting mechanism comprised by the linear actuator (14). Preferably, the second controller (26) or joystick can be coupled to and uncoupled from the rigid chassis (1) of the chair.

The chair also comprises footrests (20) on which to rest the patient's feet.

In a second preferred embodiment shown in FIGS. 9 to 12, the seat (5) elevating mechanism comprises a lower plate (6) fixed to the rigid chassis (1), an upper plate (7) joined to the seat (5) and a lifting column (25) joined both to the lower plate (6) and to the upper plate (7) for positioning the seat (5) at the desired height. Preferably, the lifting column (25) is electric.

In this second preferred embodiment, the first controller (16) or joystick makes it possible to control the movement of the gear motor (21) of the wheels (3, 4) of the chair and the movement of the electric lifting column (25), wherein the second controller (26) or joystick makes it possible to control the lifting mechanism that comprises the linear actuator (14) and the rotation mechanism, preferably electric, that makes it possible to execute the 90° rotation of the armrests (10) and the backrest (17) around a vertical axis with respect to the chassis (1) of the chair.

In this second preferred embodiment, the set of batteries (22, 27) that comprises a first battery (22) that provides motion to the gear motor (21) that actuates the rear drive wheels (3) and a second battery (27), preferably disposed on the backrest (17), that provides motion to the lifting mechanism that comprises the linear actuator (14) and the rotation mechanism, preferably electric, that makes it possible to execute the 90° rotation of the armrests (10) and the backrest (17) around a vertical axis with respect to the chassis (1) of the chair.

The lifting mechanism is preferably electric in this second preferred embodiment, such that the raised position of the armrests (10) does not require a quick-release pin for locking them.

The rotation mechanism that makes it possible to execute the 90° rotation of the armrests (10) and the backrest (17) around a vertical axis with respect to the chassis (1) of the chair is preferably electric in this second embodiment, such that the rotation mechanism does not require the closing and opening device (23) to release the rotation rod (24).

The invention claimed is:

1. An electric wheelchair comprising:
   a rigid chassis,
   a set of wheels,
   a seat,
   armrests, and
   a backrest,
   wherein the armrests comprise:
      an anchoring device for fixing a support sling for holding a patient,
   wherein the rigid chassis comprises:
      a lifting mechanism comprising an actuator connected by one end to the backrest and, by the other end, to the armrests for lifting the patient strapped into the sling by displacing the armrests by actuating the actuator, and
   wherein the armrests and the backrest are configured so as to rotate at least 90° around a vertical axis with respect to the rigid chassis.

2. The electric wheelchair of claim 1, further comprising a rotation mechanism for rotating the armrests and the backrest 90° around a vertical axis with respect to the rigid chassis of the chair, wherein the rotation mechanism comprises a closing and opening device for releasing a rotation rod whereto the actuator of the lifting mechanism is connected, which is connected by its other end to a strip whereto the armrests are articulated, in order to enable the rotation of the backrest and the armrests with respect to an upper plate joined to the seat.

3. The electric wheelchair of claim 1, further comprising a rotation mechanism for rotating the armrests and the backrest 90° around a vertical axis with respect to the rigid chassis of the chair, wherein the rotation mechanism is electric and may actuate a rotation rod whereto the actuator of the lifting mechanism is connected, which is connected by its other end to a strip whereto the armrests are articulated, in order to enable the rotation of the backrest and the armrests with respect to an upper plate joined to the seat.

4. The electric wheelchair of claim 1, wherein the armrests are foldable around a transverse axis, such that a free end of the armrests is liftable from a resting position or horizontal position to a raised position.

5. The electric wheelchair of claim 4, wherein at least one of the armrests is foldable around the transverse axis from the raised position to an essentially vertical position.

6. The electric wheelchair of claim 1, wherein the rigid chassis comprises a seat elevating mechanism comprising a lower plate fixed to the rigid chassis, an upper plate joined to the seat and a scissor mechanism actuated by means of an electric actuator.

7. The electric wheelchair of claim 1, wherein the rigid chassis comprises a seat elevating mechanism comprising a lower plate fixed to the rigid chassis, an upper plate joined to the seat and a lifting column joined both to the lower plate and to the upper plate.

8. The electric wheelchair of claim 7, wherein the lifting column is an electric lifting column.

9. The electric wheelchair of claim 1, wherein the set of wheels comprises rotary front wheels for guiding the chair and rear drive wheels.

10. The electric wheelchair of claim 9, wherein the rear drive wheels are lockable.

11. The electric wheelchair of claim 9, further comprising anti-tip wheels disposed behind the rear drive wheels.

12. The electric wheelchair of claim 2, wherein the actuator of the lifting mechanism is linear and is connected by one end to the rotation rod and, by the other end, to the strip whereto the armrests are articulated.

13. The electric wheelchair of claim 1, further comprising a backrest foldable around a transverse direction.

14. The electric wheelchair of claim 1, further comprising a first controller or joystick configured to control the movement of the set of wheels.

15. The electric wheelchair of claim 1, further comprising a second controller or joystick configured to control the movement of the actuator of the lifting mechanism.

16. The electric wheelchair of claim 3, further comprising a second controller or joystick configured to control the rotation mechanism for rotating the armrests and the backrest 90° around a vertical axis with respect to the rigid chassis of the chair.

17. The electric wheelchair of claim 14, wherein the first controller or joystick is configured to be coupled to and uncoupled from one of the armrests of the chair.

18. The electric wheelchair of claim 15, wherein the second controller or joystick is configured to be coupled to and uncoupled from the rigid chassis of the chair.

19. The electric wheelchair of claim 1, further comprising footrests.

* * * * *